No. 703,103. Patented June 24, 1902.
H. E. WEBER.
SYRINGE NOZZLE.
(Application filed Mar. 14, 1902.)
(No Model.)
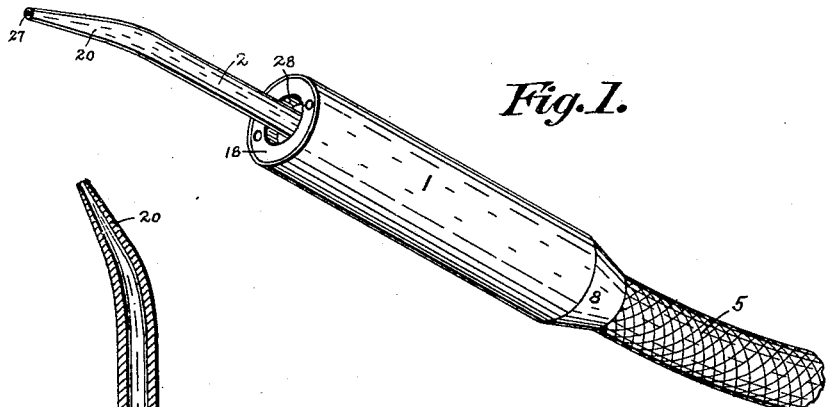
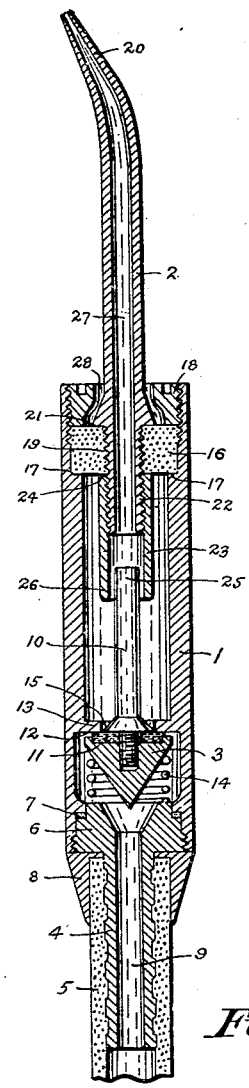
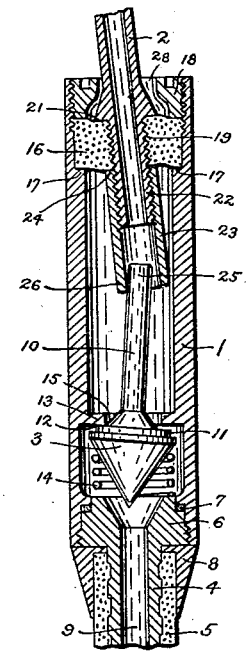
Witnesses:
S. M. Liggett
Joseph Frease
Inventor:
Henry E. Weber,
By Harry Frease, Attorney.

UNITED STATES PATENT OFFICE.

HENRY E. WEBER, OF CANTON, OHIO.

SYRINGE-NOZZLE.

SPECIFICATION forming part of Letters Patent No. 703,103, dated June 24, 1902.

Application filed March 14, 1902. Serial No. 98,248. (No model.)

*To all whom it may concern:*

Be it known that I, HENRY E. WEBER, a citizen of the United States, residing at Canton, in the county of Stark and State of Ohio, have invented a new and useful Syringe-Nozzle, of which the following is a specification.

My invention relates to improvements in nozzles for controlling the flow of water from hose, as of a dentist's syringe; and the object of my improvement is to provide means for easily opening the normally closed valve by a slight pressure against the side of the nozzle-spout. I attain this object by the mechanism illustrated in the accompanying drawings, in which—

Figure 1 is a perspective view of the nozzle with a short piece of hose attached; Fig. 2, an enlarged longitudinal middle section of the same, showing the valve in its normal closed position; and Fig. 3, a similar section showing the valve open.

Similar numerals refer to similar parts throughout the drawings.

The nozzle is composed of the hollow cylindrical case 1, the tubular spout 2, the valve 3, and the shank 4, to which shank is attached the hose 5. The shank is screwed into one end of the case by means of the threaded head 6, a tight joint being secured by the washer 7. The hose is shrunk around the shank and cemented, if desired, the connection with the case being finished by the ferrule 8. The passage 9 through the shank communicates from the hose to the interior of the case.

The valve 3 is preferably shaped as a cone with the apex toward the hose end of the case, and it has the stem 10 projecting from the cone-base toward the spout end of the case, normally along the middle line. The stem is preferably screwed into the valve and secures against the face thereof the packing-washer 11. The valve normally rests against the seat 12, formed by the internal annular flange 13 in the case, and is held in this position by the coil-spring 14, acting between the valve and the shank-head, and by the water-pressure when in use. The valve-stem passes through the aperture 15 in the valve-seat and is smaller than said aperture, thus leaving a space around the stem for the flow of water when the valve is lifted from the seat.

The elastic disk 16 is located near the spout end of the case, and the inner side of its rim rests on the annular shoulder 17, formed in the case, where it is securely held by the externally-threaded collar 18 being screwed into the end of the case against the outer side of said rim. The disk has a central aperture 19, through which passes the spout 2. In nozzles of small diameter the disk is preferably made of rubber or other compressibly elastic material, as illustrated; but in larger nozzles it can as well be made of elastic sheet metal.

The spout 2 has its outer end 20 bent or curved in any desired manner, and near its inner end is formed the external annular shoulder 21, which rests against the outer side of the disk around the aperture 19. On the threaded inner end 22 of the spout is screwed the thimble 23, the end 24 of which engages the inner side of the disk around the aperture 19.

The parts are so spaced and arranged that the free end 25 of the valve-stem enters the free end 26 of the thimble. The thimble being slightly larger than the valve-stem there is always a free way for water from the interior of the case into the passage 27 through the spout, and the aperture 28 of the collar 18 is formed large enough to give the spout which passes therethrough considerable side movement.

A pressure applied to the side of the spout outside of the case will bend or compress the elastic disk, and the inner end of the spout, with the attached thimble, will be moved to one side, the spout turning in the disk as a pivotal point, as illustrated in Fig. 3. The side movement of the thimble carries the free end of the valve-stem with it, thus tilting the valve away from its seat on one side and opening it. When the pressure is removed from the side of the spout, the elasticity of the disk brings the parts back to their normal position in the middle line and the valve is closed, the closing being made positive by the coil-spring and the water-pressure.

What I claim as my invention, and desire to secure by Letters Patent, is—

1. In a nozzle, a valve-case, a valve normally held on a seat in said case, a stem projecting from said valve, an elastic disk attached by its rim in said case, there being an aperture in said disk, and a spout located in said aperture and attached to said disk and having its inner end located around the free end of said valve-stem.

2. In a nozzle, a valve-case, an elastic disk attached by its rim in said case, there being an aperture in said disk, a spout located in said aperture, and a valve in said case adapted to be opened by movement of the inner end of said spout.

In testimony whereof I have signed my name to this specification in the presence of two subscribing witnesses.

HENRY E. WEBER.

Witnesses:
S. M. LIGGETT,
HARRY FREASE.